(12) United States Patent
Chism

(10) Patent No.: US 7,866,579 B2
(45) Date of Patent: Jan. 11, 2011

(54) SPREADER

(76) Inventor: Stan Chism, P.O. Box 69393, Odessa, TX (US) 79969

( * ) Notice: Subject to any disclaimer, the term of this patent is extended or adjusted under 35 U.S.C. 154(b) by 117 days.

(21) Appl. No.: 12/467,305

(22) Filed: May 18, 2009

(65) Prior Publication Data

US 2010/0288859 A1 Nov. 18, 2010

(51) Int. Cl.
*A01C 17/00* (2006.01)
(52) U.S. Cl. .................. 239/687; 239/681; 222/625; 119/57.91
(58) Field of Classification Search ......... 239/681–685, 239/687; 222/560, 561, 609, 624, 625; 119/57.91, 119/53.5, 54
See application file for complete search history.

(56) References Cited

U.S. PATENT DOCUMENTS

| 396,251 | A | | 1/1889 | Adamson |
| 3,170,264 | A | | 2/1965 | Waldrum |
| 4,565,159 | A | * | 1/1986 | Sweeney .................. 119/53 |
| 4,986,220 | A | | 1/1991 | Reneau et al. |
| 5,020,701 | A | * | 6/1991 | Donelson ................. 222/494 |
| 5,143,289 | A | | 9/1992 | Gresham et al. |
| 5,820,035 | A | | 10/1998 | Johnson et al. |
| 6,209,808 | B1 | | 4/2001 | Anderson |
| 7,063,280 | B1 | | 6/2006 | Bogart et al. |
| 7,306,175 | B1 | * | 12/2007 | Farmer .................... 239/666 |
| 2002/0014545 | A1 | | 2/2002 | Woodruff et al. |
| 2003/0192968 | A1 | | 10/2003 | Courtney et al. |

OTHER PUBLICATIONS

"Centrifugal governor", website: http://en.wikipedia.org/wiki/Centrifugal_governor; printed Feb. 26, 2009; 2 pages.
"Governor", website: http://en.wikipedia.org/wiki/Governor; Feb. 26, 2009; 3 pages.

* cited by examiner

*Primary Examiner*—Dinh Q Nguyen
(74) *Attorney, Agent, or Firm*—Christopher Wood; Premier Law Group

(57) ABSTRACT

A spreader (100) for spreading material, which in one embodiment comprises an upper bracket (120), a shaft (140), a return spring (160), a lower bracket (180), first and second sets of chain links (200a and 200b), and a spreader plate (220). The upper and lower brackets (120 and 180) are preferably aligned in the same vertical plane. The first and second chain links (200a and 200b) are located on opposite sides of the spreader (100) and on either side of the shaft (140). Upon rotation of the spreader (100) the first and second sets of chain links (200a and 200b) experience a centrifugal force sufficient to cause the spreader plate (220) to move down the shaft (140) and upon ceasing rotation the spreader plate (220) returns to a default position proximate to the top of the shaft (140).

4 Claims, 9 Drawing Sheets

| TABLE 1 ||
|---|---|
| Part # | |
| 100 | spreader |
| 120 | upper bracket |
| 122<br>124 | first 122 and second 124 opposite ends of upper bracket |
| 126 | middle portion of upper bracket 120 |
| 128 | hole of middle portion 126 |
| 140 | shaft 140 |
| 140t<br>140b | opposite top 140t and bottom 140b ends of shaft 140 |
| 160 | return spring |
| 180 | lower bracket |
| 185<br>190 | first 185 and second 190 opposite ends of lower bracket 180 |
| 195 | middle portion of lower bracket 180 |
| 197 | bottom surface of middle portion 195 |
| 198 | lower-bracket opening |
| 199 | upper side 199 of middle portion 195 |
| 200 | first 200a and second 200b sets of chain links |
| 201 | sleeve |
| 220 | spreader plate |
| 220b | bottom side of spreader plate 220 |
| 220t | top side of spreader plate 220 |
| 240 | central plate-hole |
| 260 | upper end of first set of chain links 200a |

*Fig. 8A*

| TABLE 1 | |
|---|---|
| Part # | |
| 265a 265b | optional first and second sidewalls 265a and 265b |
| 280 | lower end of first set of chain links 200a |
| 300 | upper end of second set of chain links 200b |
| 320 | lower end of second set of chain links 200b |
| 340 | bushing |
| 340b | bottom of bushing 340 |
| 340t | top of bushing 340 |
| 360 | bushing bore |
| 380 | motor 380 |
| 400 | motor shaft 400 |
| 420 | hopper 420 |
| 440 | hopper outlet port 440 |
| 460 | optional through-bore 460 |
| 480 | plurality of paddles 480 |

SPREADER

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates to devices for spreading material such as granular or powdery material. More specifically, the invention is a device for spreading material such as, but not limited to: seeds, sand, grit, salt, fertilizer, lime; and animal feed such as, but not limited to, corn, milo, and maze, protein pellets, game feed, bird feed and fish feed.

BACKGROUND OF THE INVENTION

A common type of particulate spreader comprises a distribution member, such as a spinning disk, mounted for rotation about an upwardly extending rotary axis. Material such as seeds is typically directed from a container, such as a hopper, through an outlet port in the container and onto a spinning disk. On contact with the upper surface of the spinning disk centrifugal force spreads the material in an outward radial direction from the spinning disk. A common problem with such spreaders is leakage of material through the outlet port of the container when the spreader is not in use.

Therefore there is a need for improved or alternative ways to avoid wasting material through inadvertent leakage of material through the outlet port of a container such as a hopper when the spreader is not in use.

SUMMARY OF THE INVENTION

A spreader (100) for spreading material, which in one embodiment comprises an upper bracket (120), a shaft (140), a return spring (160), a lower bracket (180), first and second sets of chain links (200a and 200b), and a spreader plate (220). The upper and lower brackets (120 and 180) are preferably aligned in the same vertical plane. The first and second chain links (200a and 200b) are located on opposite sides of the spreader (100) and on either side of the shaft (140). Upon rotation of the spreader (100) the first and second sets of chain links (200a and 200b) experience a centrifugal force sufficient to cause the spreader plate (220) to move down the shaft (140) and upon ceasing rotation the spreader plate (220) returns to a default position proximate to the top of the shaft (140).

BRIEF DESCRIPTION OF THE DRAWINGS

FIGS. 8A and 8B show Table 1.

DETAILED DESCRIPTION OF THE INVENTION

The present invention is directed to a spreader for spreading material such as granular or powdery material such as, but not limited to: seeds, sand, grit, salt, fertilizer, lime; and animal feed such as, but not limited to, corn, milo, and maze, protein pellets, game feed, bird feed and fish feed. The spreader of the present invention is denoted generally by the numeral 100.

The terms "hopper" and "container" are hereinafter regarded as equivalent terms. It will be understood that the terms "upper and lower", "front and rear", and "top and bottom" are used for convenience to describe relative directional reference in the common orientation of spreader 100 as shown, for example, in FIG. 1.

Figure 3:
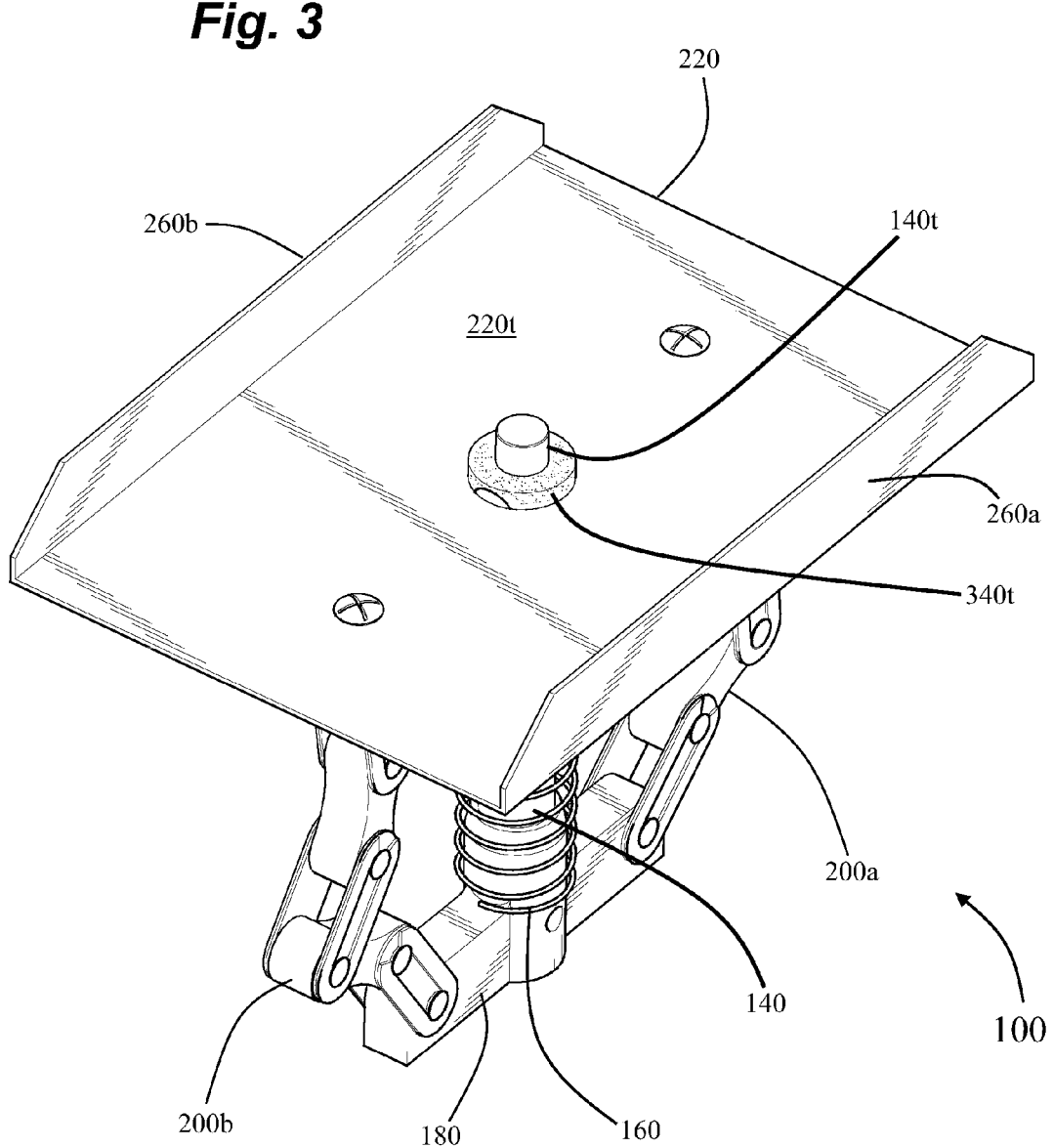
FIG. 3 shows a perspective elevated view of the spreader (100) shown in FIG. 1.
Figure 4:
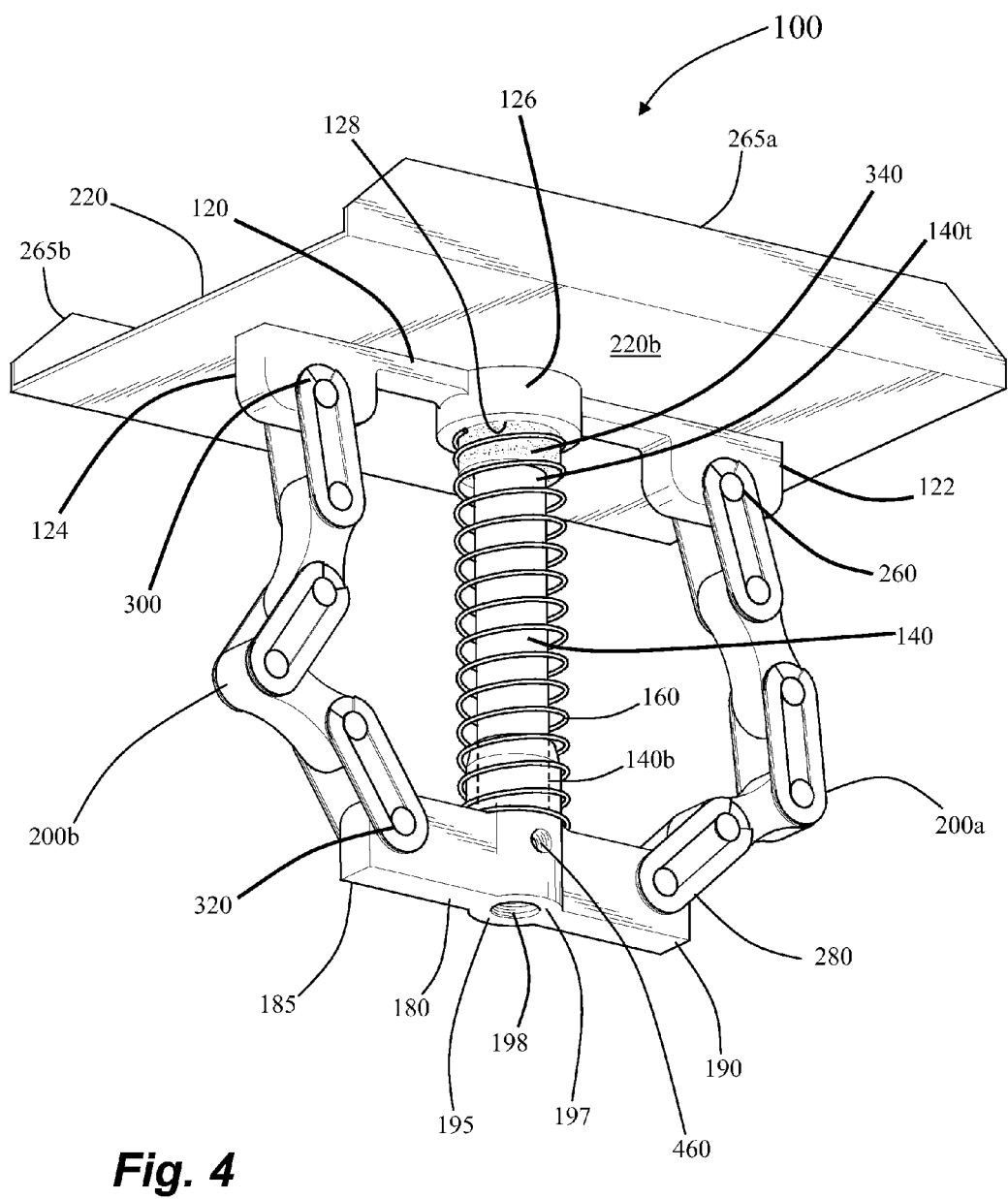
FIG. 4 shows a perspective elevated view of the spreader (100) shown in FIG. 1.
Figure 5:
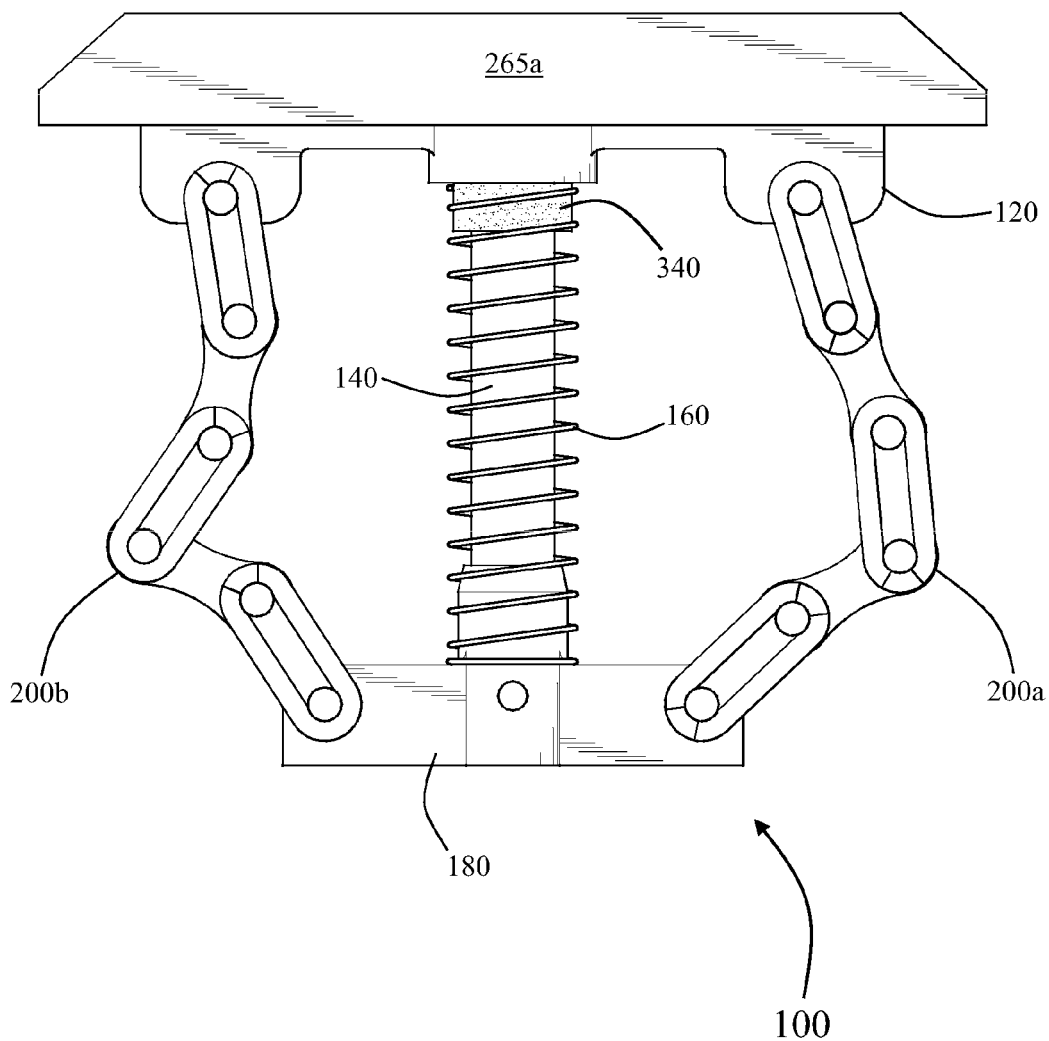
FIG. 5 shows a side view of the spreader (100) shown in FIG. 1.
Figure 6:
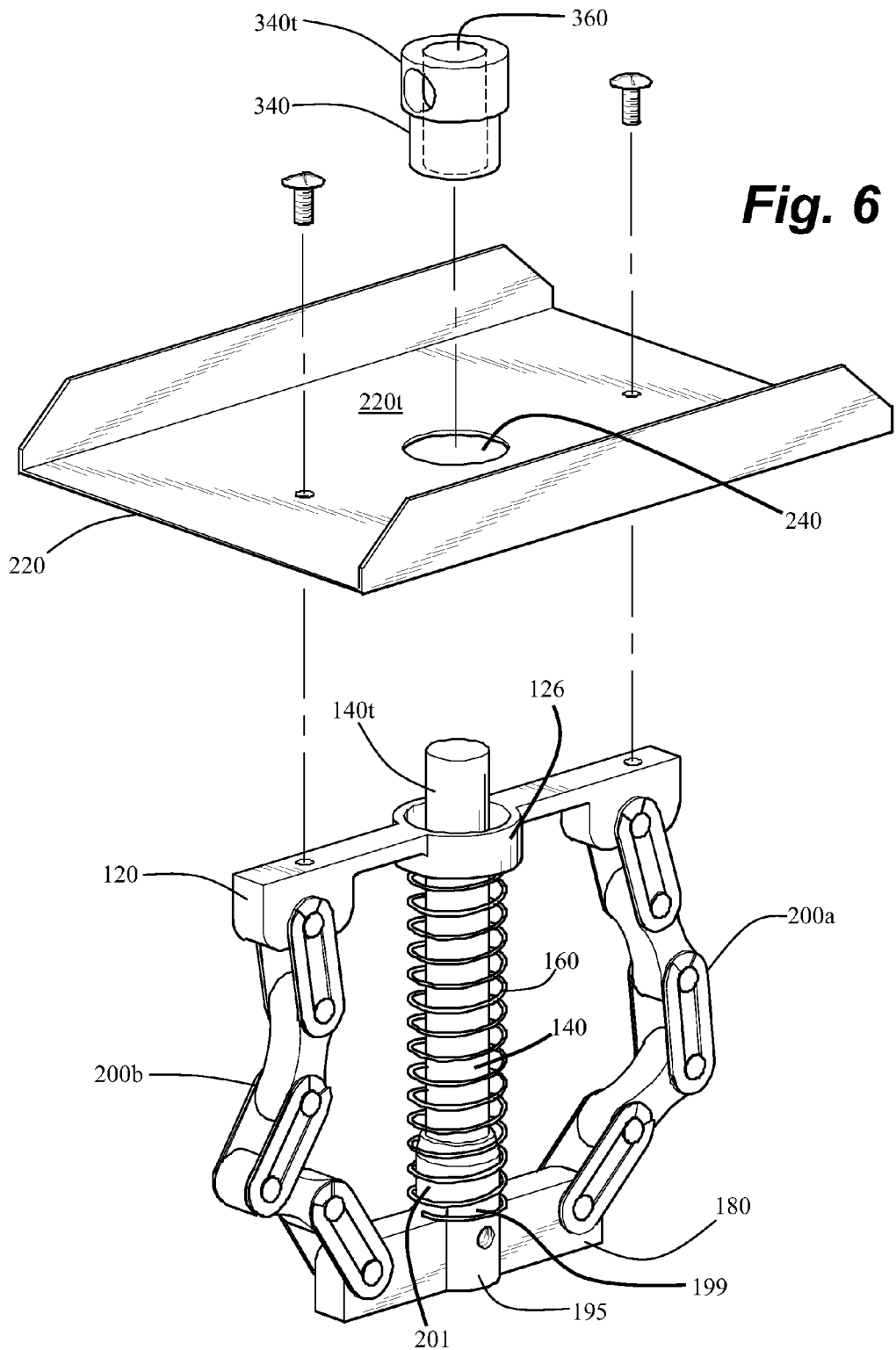
FIG. 6 shows a partially exploded view of the spreader (100) shown in FIG. 1.

In one embodiment the spreader 100 comprises an upper bracket 120, a shaft 140, a return spring 160, a lower bracket 180, at least two sets of chain links 200, and a spreader plate 220. The upper and lower brackets 120 and 180 are preferably aligned in the same vertical plane. The at least two sets of chain links 200 are represented, for example, in FIG. 3 by first and second chain links 200a and 200b. The first and second chain links 200a and 200b are located on opposite sides of the spreader 100 and on either side of the shaft 140 as shown, for example, in FIG. 4.

The upper bracket 120 defines first 122 and second 124 opposite ends and a middle portion 126. The middle portion 126 of the upper bracket 120 defines an upper-bracket hole 128 therethrough. The shaft 140 has opposite top 140t and bottom 140b ends. The top end 140t of the shaft 140 fits in slidable engagement through the hole 128 in the middle portion 126 of the upper bracket 120.

The lower bracket defines first 185 and second 190 opposite ends and a middle portion 195. The middle portion 195 having a bottom surface 197, and an upper side 199. The bottom surface 197 of the middle portion 195 of the lower bracket 180 defines a lower-bracket opening 198. A sleeve 201 extends upwards from the upper side 199 of middle portion 195. The sleeve 201 accommodates the bottom end 140b of shaft 140.

The spreader plate 220 has a central plate-hole 240 therethrough, top surface 220t and bottom surface 220b. The central plate-hole 240 of the spreader plate 220 is aligned with the hole 128 of the middle portion 126 of the upper bracket 120. The central plate-hole 240 fits over the top 140t of the shaft 140, and the return spring 160 is located around the shaft 140 and located between the upper 120 and lower 180 brackets. The bottom 140b of the shaft 140 is attached to the middle portion 195 of the lower bracket 180.

The upper bracket 120 is attached to the bottom surface 220b of the spreader plate 220. The first set of chain links 200a defines upper 260 and lower 280 ends, and the second set of chain links 200b defines upper 300 and lower 320 ends. The upper end of each set of chain links is attached to the upper bracket 120 and the lower end of each set of chain links is attached to the lower bracket 180.

The spreader plate 220 is moveable between an up-shaft default position and a down-shaft position (see FIGS. 1 and 2, respectively) such that in the down-shaft position the return spring 160 is at least partly compressed and in the up-shaft default position the return spring 160 is in a substantially uncompressed state. When the spreader plate 220 is in the up-shaft default position the spreader plate 220 is mounted on and located proximate to the top 140*t* of the shaft 140. It should be understood that the term "down-shaft position" merely refers to movement of the spreader plate 220 down at least a portion of the shaft 140 and is not intended to mean that the spreader plate 220 moves to the bottom 140*b* of the shaft 140.

Upon rotating the spreader 100 the sets of chain links 200 generate an outwards centrifugal force causing the spreader plate 220 to travel down the shaft 140 thereby at least partly compressing the return spring 160, and upon ceasing rotation of the spreader 100 the return spring 160 causes the spreader plate to return to its default position. That portion of the shaft 140 that the spreader plate 220 travels down lacks a thread and hence differs from the shaft described in U.S. Pat. No. 5,820,035; i.e., the shaft 140 of the present invention lacks the shaft thread described in U.S. Pat. No. 5,820,035; specifically, "coarse spiral thread 15" of column 3, lines 39-40, "shaft thread 15" at column 3, line 42, and also referred to as "spiral thread 15" at line 60 in column 3 in U.S. Pat. No. 5,820,035.

A bushing 340 can be used to prevent direct contact between the shaft 140 and the spreader plate 220 thus helping to avoid metal-metal contact if the spreader plate 220 and shaft 140 are both made out of metal or metal alloy. The optional bushing 340 can be made out of any suitable material such as plastic, such as a low friction coefficient plastic to allow easy movement of the bushing 340 (and hence spreader plate 220 to which the bushing is also attached) up and down the shaft 140, particularly the top part of the shaft 140*t*. For example, the optional bushing 340 can be made of a synthetic resin material, said synthetic resin material having a composition comprising a polyacetal resin and a silicone-containing lubricant as described in U.S. Pat. No. 6,250,458; U.S. Pat. No. 6,250,458 is incorporated herein by reference in its entirety. The shaft 140, or at least a portion of the shaft 140, can be optionally coated with a low friction coefficient polymer such as polytetrafluoroethylene (PTFE).

The optional bushing 340 defines a bore 360 therethrough. The overall shape of the bushing can vary but it is preferred that the bushing 340 extends through central plate-hole 240 and hole 128 in the middle portion 126 of the upper bracket 120. The bushing 340 acts as a guide for the plate 220 with respect to shaft 140.

The parts that make up the spreader 100 can be made out of any suitable material such as metal (e.g., steel or aluminum) or metal alloy or plastic.

Figure 7:
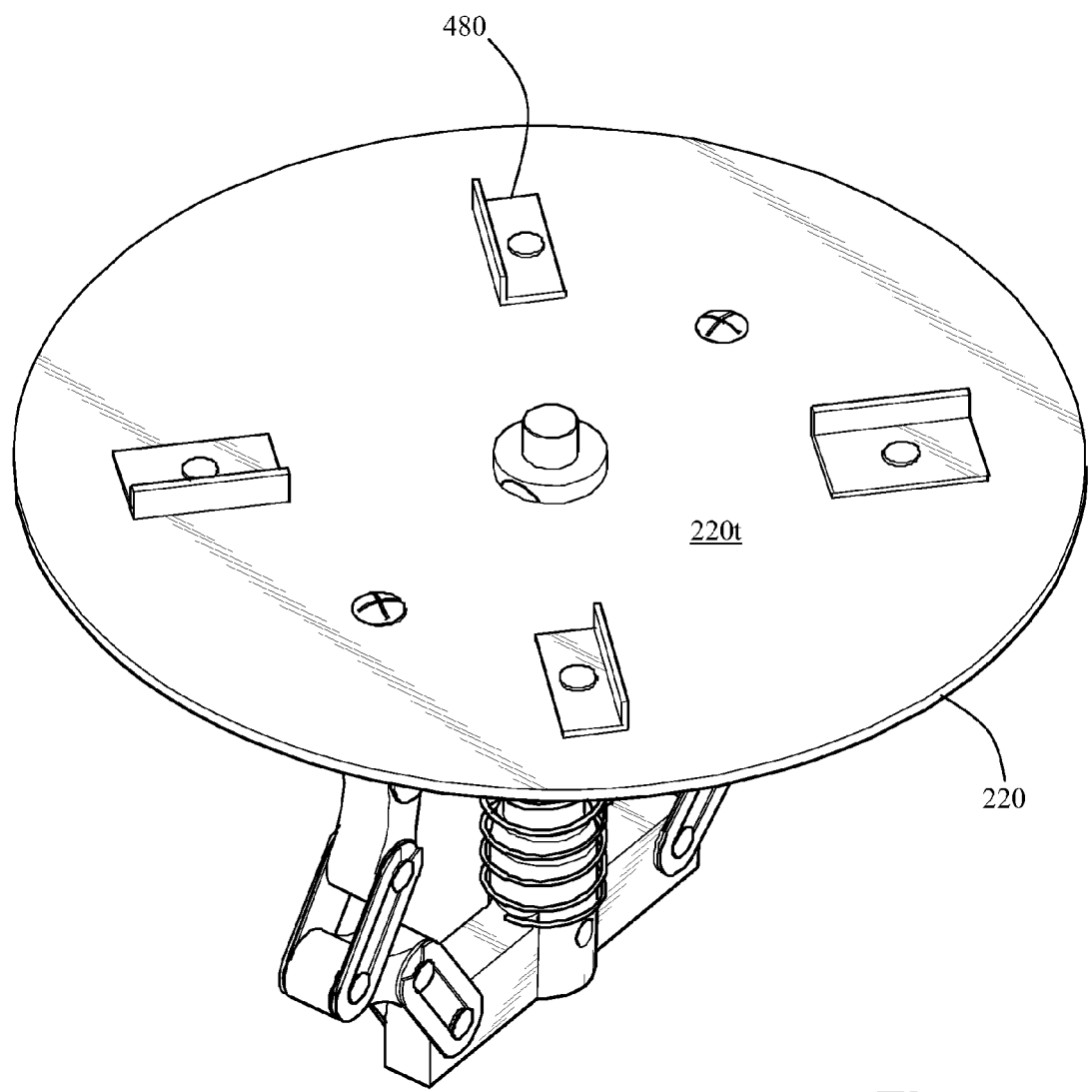
FIG. 7 shows a spreader with a circular spreader plate and paddles thereon.

The spreader plate 220 can be a plate with four sides with optional sidewalls on two opposite sides. For example, in FIG. 4 the spreader plate 220 is of general rectangular appearance and defines first and second opposite facing sidewalls 265*a* and 265*b*. When the spreader plate 220 is rotated the sidewalls 265*a* and 265*b* facilitate in propelling the material outwards from the spreader plate 220. However, the sidewalls 265*a* and 265*b* are optional and can be omitted from the spreader plate 220. It should be understood that the spreader plate 220 is not limited to a particular planar shape. For example, spreader plate 220 can have a planar circular appearance and be fitted with a plurality of paddles 480 in place of sidewalls 265*a* and 265*b* (see FIG. 7).

Figure 1:
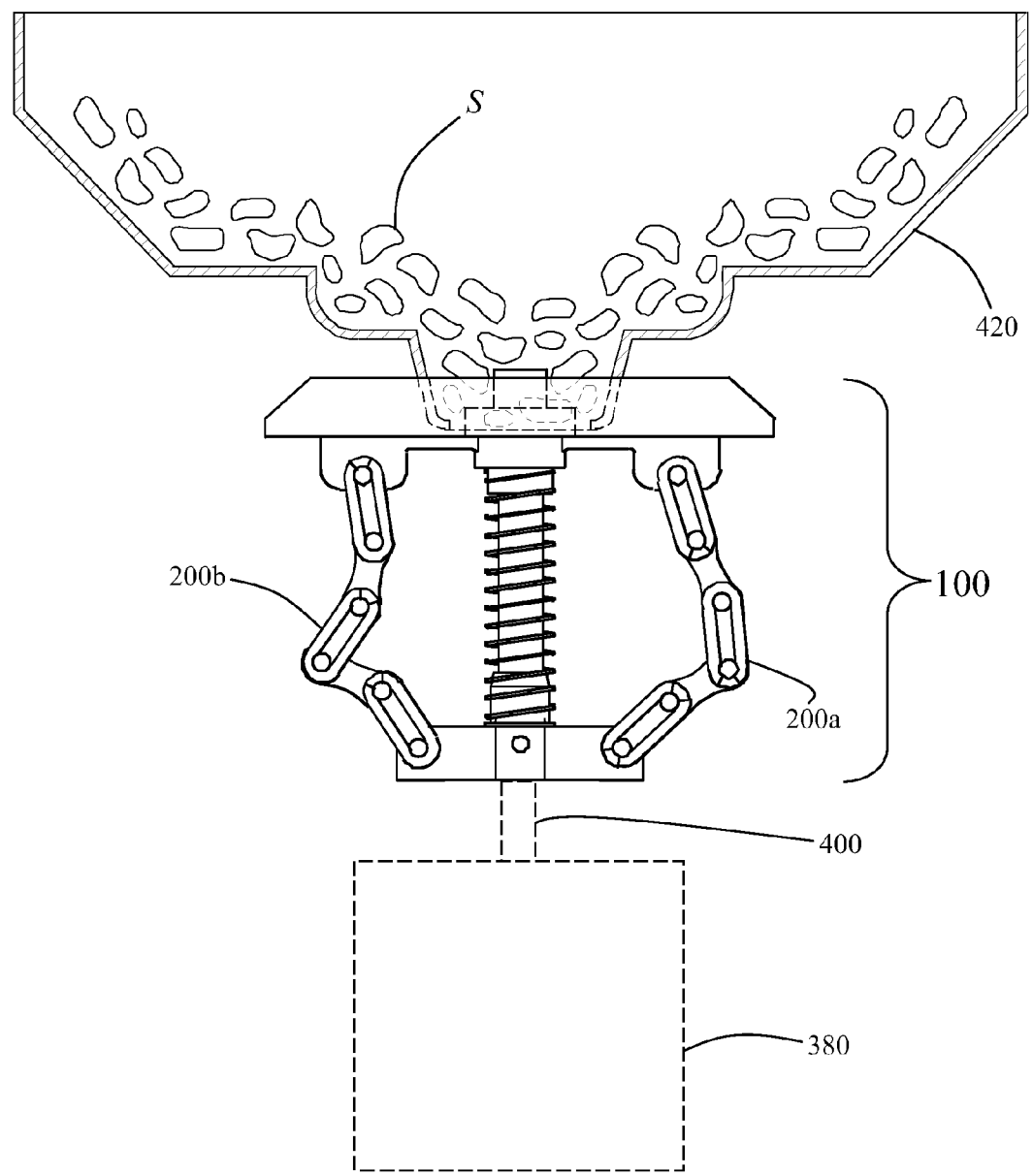
FIG. 1 shows an environmental view of a spreader (100) according to the invention.
Figure 2:
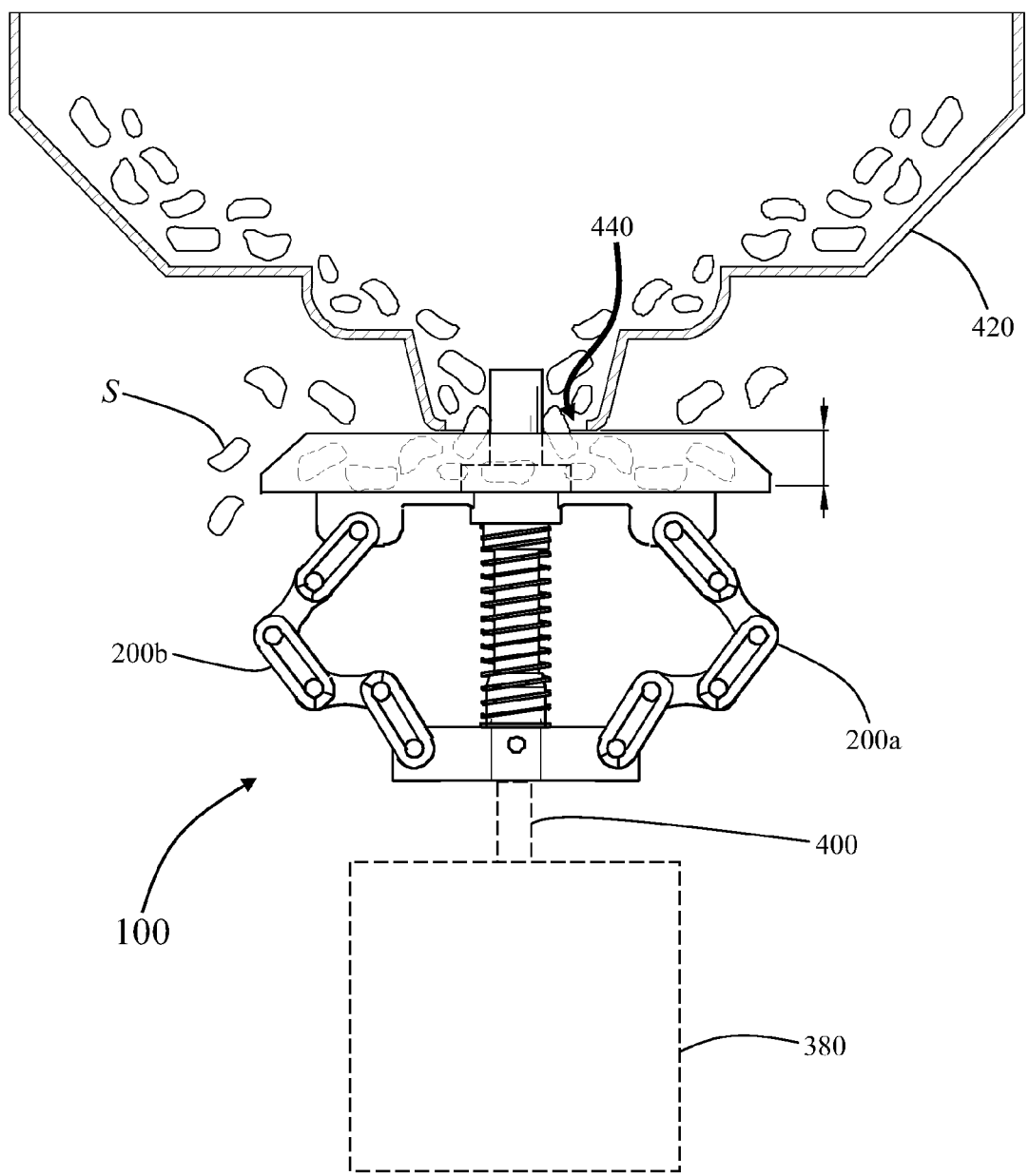
FIG. 2 shows a further environmental view of the spreader (100) shown in FIG. 1.

During actual use the spreader 100 is operably coupled to a rotary power source in the form of a motor 380 fitted with an outward extending motor shaft 400 directly or indirectly coupled to the spreader 100 (see FIGS. 1 and 2). Upon rotation of the spreader 100 the spreader plate 220 moves down the shaft 140 to a down-shaft position under the influence of centrifugal force operating on the first and second sets of chain links 200*a* and 200*b* whereupon material, such as seeds S, fall from a hopper 420 through a hopper outlet port 440 and thence onto the spreader 100 (see FIG. 2). More specifically, seeds S fall onto the top side 220*t* of spreader plate 220 and through the spinning action of the spreader plate 220 are propelled outwards onto, for example, a field (not shown). When the spreader 100 is not being rotated the return spring 160 biases the spreader plate 120 to adopt a default up-shaft position.

The motor shaft 400 is fitted into opening 198 of lower bracket 180. The opening 198 can be, for example, a thread lined blind hole. In the alternative, opening 198 can be, for example, a thread lined through bore extending right through the middle portion 195 of lower bracket 180. An optional through-bore 460 can be in tangential communication with opening 198. A locking screw (not shown) can be inserted into optional through-bore 460 to assist in securing motor shaft 400 to the lower bracket 180 and hence to spreader 100.

The motor 380 can be any suitable motor that can provide rotational kinetic energy. Suitable power units include, but are expressly not limited to: a gasoline or diesel engine, a vehicle power take-off shaft. Rotational kinetic energy can also be provided to the spreader 100, for example, from a vehicle wheel operably coupled to a drive belt with one end of the drive belt operably coupled to gearing to provide rotational kinetic energy to the spreader 100.

For the convenience of the reader, Table 1 (see FIGS. 8A and 8B) lists the parts of the spreader 100 as numbered in FIGS. 1 through 7.

It is to be understood that the present invention is not limited to the embodiments described above, but encompasses any and all embodiments within the scope of the following claims.

I claim:

1. A spreader (100) for spreading material, comprising:
    an upper bracket (120) having first and second opposite ends (122 and second 124) and a middle portion (126), said middle portion (126) defining a hole (128) therethrough;
    a shaft (140) having opposite top and bottom ends (140*t* and 140*b*), said top end (140*t*) fits in slidable engagement through said hole (128);
    a return spring (160);
    a lower bracket (180), said lower bracket (180) having first and second opposite ends (185 and 190) and a middle portion (195), said middle portion (195) of said lower bracket (180) having a bottom surface (197), said bottom surface (197) of said middle portion (195) of said lower bracket (180) defining a lower bracket opening (198),
    first and second sets of chain links (200*a* and 200*b*); and
    a spreader plate (220) having a central plate-hole (240) therethrough, top and bottom surface, wherein said upper bracket is attached to the bottom surface of said spreader plate,
    wherein each of said set of chain links (200*a* and 200*b*) have opposite upper and lower ends, wherein the upper ends of said first and second sets of chain links (200*a* and 200*b*) are respectively attached to said first and second ends of said upper bracket, wherein the lower ends of said first and second sets of chain links (200*a* and 200*b*) are respectively attached to said first and second ends of said lower bracket,
    wherein said central plate-hole (240) of said spreader plate (220) is aligned with said upper-bracket hole (128) of said middle portion (126) of said upper bracket (120), said central plate-hole (240) fits over the top (140*t*) of said shaft (140), and said return spring (160) is located around said shaft (140) and located between said upper and lower brackets (120 and 180), wherein the bottom of said shaft (140b) is attached to the middle portion (195) of said lower bracket (180), whereby upon rotating said spreader (100) said first and second sets of chain links (200a and 200b) generate an outwards centrifugal force causing the spreader plate (220) to move to a down-shaft position thereby at least partly compressing said return spring (160), and upon ceasing rotation of said spreader (100) the return spring (160) causes said spreader plate (220) to return to an up-shaft default position.

2. The spreader (100) for spreading material of claim 1, wherein said upper and lower brackets (120 and 180) occupy the same vertical plane.

3. The spreader (100) of claim 1, further comprising a bushing (340), wherein the bushing (340) extends through central plate-hole (240) and hole (128) in the middle portion (126) of the upper bracket (120).

4. A spreader (100) for spreading material, comprising:

a shaft lacking an external thread;

a spreader plate having a bottom surface and mounted about said shaft such that said spreader plate can move up and down said shaft between a default up-shaft position and a down-shaft position;

a return spring, said return spring is mounted about said shaft and below said spreader plate such that said return spring biases said spreader plate to adopt the up-shaft position;

lower and upper brackets, wherein each of said lower and upper brackets each define a middle portion and first and second opposite ends, wherein said shaft extends upwards from the middle portion of said lower bracket and extends through the middle portion of said upper bracket when said spreader plate is in the down-shaft position; and first and second sets of chain links each having opposite upper and lower ends, wherein the upper ends of said first and second sets of chain links are respectively attached to said first and second ends of said upper bracket, wherein the lower ends of said first and second sets of chain links are respectively attached to said first and second ends of said lower bracket.

\* \* \* \* \*